(12) United States Patent
Zhang et al.

(10) Patent No.: US 11,096,152 B2
(45) Date of Patent: Aug. 17, 2021

(54) PREAMBLE DESIGN FOR GRANT FREE TRANSMISSION AND RECEPTION

(71) Applicant: Nokia Technologies Oy, Espoo (FI)

(72) Inventors: Yuantao Zhang, Beijing (CN); Yi Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/487,791

(22) PCT Filed: Mar. 20, 2017

(86) PCT No.: PCT/CN2017/077270
§ 371 (c)(1),
(2) Date: Aug. 21, 2019

(87) PCT Pub. No.: WO2018/170669
PCT Pub. Date: Sep. 27, 2018

(65) Prior Publication Data
US 2020/0236657 A1 Jul. 23, 2020

(51) Int. Cl.
*H04W 72/04* (2009.01)

(52) U.S. Cl.
CPC .................. *H04W 72/04* (2013.01)

(58) Field of Classification Search
None
See application file for complete search history.

(56) References Cited

U.S. PATENT DOCUMENTS

2014/0376483 A1  12/2014  Hong et al.
2019/0357243 A1*  11/2019  Takeda .............. H04W 72/1268

FOREIGN PATENT DOCUMENTS

CN    105704834 A    6/2016
CN    106105086 A    11/2016
(Continued)

OTHER PUBLICATIONS

"Framework for Grant-Free Acess for URLLC", 3GPP TSG RAN WG1 AH_NR Meeting, R1-1700689, Agenda : 5.1.3.4, Ericsson, Jan. 16-20, 2017, 3 pages.
(Continued)

*Primary Examiner* — Kouroush Mohebbi
(74) *Attorney, Agent, or Firm* — Nokia Technologies Oy (57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: receive indication of bandwidth allocation for grant-free preamble transmission, receive indication of bandwidth allocation for grant-free resources, wherein the bandwidth allocated for grant-free preamble transmission is the same or larger than the bandwidth allocated for grant-free resources, receive configuration of one or more preamble repetition units, and allocate resources for grant-free preamble and data transmissions, wherein the grant-free preamble is allocated in the configured one or more preamble repetition units and within the bandwidth allocated for grant-free preamble transmission, and data is allocated in the grant-free resources.

20 Claims, 9 Drawing Sheets

(56) References Cited

FOREIGN PATENT DOCUMENTS

CN  106416394 A  2/2017
WO  2016/028060 A1  2/2016

OTHER PUBLICATIONS

"Grant-free Transmission Scheme for UL URLLC", 3GPP TSG RAN WG1 Meeting #87, R1-1611689, Agenda : 7.1.4.4, Huawei, Nov. 14-18, 2016, 9 pages.
"Channel Structure for Contention Based Access", 3GPP TSG-RAN WG1 #86, R1-167254, Agenda : 8.1.2.2, Aug. 22-26, 2016, 4 pages.
International Search Report and Written Opinion received for corresponding Patent Cooperation Treaty Application No. PCT/CN2017/077270, dated Aug. 30, 2017, 12 pages.

\* cited by examiner

PREAMBLE DESIGN FOR GRANT FREE TRANSMISSION AND RECEPTION

RELATED APPLICATION

This application was originally filed as PCT Application No. PCT/CN2017/077270 filed Mar. 20, 2017.

TECHNICAL FIELD

The present application relates to wireless communications and, in particular, to methods, apparatuses and computer programs for grant-free transmission and reception in a wireless communication system.

BACKGROUND

Currently a new fifth generation (5G) wireless communication technique is being studied in the third generation partnership project (3GPP). According to a standpoint of the International Telecommunication Union (ITU), there are three typical application scenarios in a 5G wireless communication system. The first one is enhanced mobile broadband (eMBB) communication, which requires a peak rate up to 10 Gbps for intelligent end users in order to support virtual reality, live video broadcasting and sharing, cloud access at anytime and anywhere, and other applications. The second one is massive machine type communication (mMTC), which supports a high density of human and things in the wireless communication system, for example, human and things connected to a 5G network may reach 1 million per square kilometer. The third scenario is ultra-reliable low-latency communications (URLLC), which requires that latency of a 5G network should be limited to one millisecond at the most so that applications with a low latency requirement, such as intelligent manufacturing, remote mechanical control, assisted driving and automatic driving, can be supported.

To meet performance requirements of some applications to be supported in a 5G network, schemes for data transmission and reception have to be improved.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: receive indication of bandwidth allocation for grant-free preamble transmission, receive indication of bandwidth allocation for grant-free resources, wherein the bandwidth allocated for grant-free preamble transmission is the same or larger than the bandwidth allocated for grant-free resources, receive configuration of one or more preamble repetition units, and allocate resources for grant-free preamble and data transmissions, wherein the grant-free preamble is allocated in the configured one or more preamble repetition units and within the bandwidth allocated for grant-free preamble transmission, and data is allocated in the grant-free resources.

According to a second aspect of the present invention, a method comprising: receiving indication of bandwidth allocation for grant-free preamble transmission, receiving indication of bandwidth allocation for grant-free resources, wherein the bandwidth allocated for grant-free preamble transmission is the same or larger than the bandwidth allocated for grant-free resources, receiving configuration of one or more preamble repetition units, and allocating resources for grant-free preamble and data transmissions, wherein the grant-free preamble is allocated in the configured one or more preamble repetition units and within the bandwidth allocated for grant-free preamble transmission, and data is allocated in the grant-free resources.

According to a third aspect of the present invention, a computer program product comprising a non-transitory computer-readable medium bearing computer program code embodied therein for use with a computer, the computer program code comprising: receiving indication of bandwidth allocation for grant-free preamble transmission, receiving indication of bandwidth allocation for grant-free resources, wherein the bandwidth allocated for grant-free preamble transmission is the same or larger than the bandwidth allocated for grant-free resources, receiving configuration of one or more preamble repetition units, and allocating resources for grant-free preamble and data transmissions, wherein the grant-free preamble is allocated in the configured one or more preamble repetition units and within the bandwidth allocated for grant-free preamble transmission, and data is allocated in the grant-free resources.

According to a fourth aspect of the present invention, an apparatus comprising: at least one processor; and at least one memory including computer program code, wherein the at least one memory and the computer program code are configured to, with the at least one processor, cause the apparatus to perform at least the following: configure bandwidth allocation for grant-free preamble transmission, configure bandwidth allocation for grant-free resources, wherein the bandwidth allocated for grant-free preamble transmission is the same or larger than the bandwidth allocated for grant-free resources, configure one or more preamble repetition units, and receive grant-free preamble and data from a user equipment, wherein the grant-free preamble is received in the configured one or more preamble repetition units and within the bandwidth allocated for grant-free preamble transmission, and data is received in the bandwidth allocated for grant-free resources.

According to a fifth aspect of the present invention, a method comprising: configuring bandwidth allocation for grant-free preamble transmission, configuring bandwidth allocation for grant-free resources, wherein the bandwidth allocated for grant-free preamble transmission is the same or larger than the bandwidth allocated for grant-free resources, configure one or more preamble repetition units, and receiving grant-free preamble and data from a user equipment, wherein the grant-free preamble is received in the configured one or more preamble repetition units and within the bandwidth allocated for grant-free preamble transmission, and data is received in the bandwidth allocated for grant-free resources.

According to a sixth aspect of the present invention, a computer program product comprising a non-transitory computer-readable medium bearing computer program code embodied therein for use with a computer, the computer program code comprising: configuring bandwidth allocation for grant-free preamble transmission, configuring bandwidth allocation for grant-free resources, wherein the bandwidth allocated for grant-free preamble transmission is the same or larger than the bandwidth allocated for grant-free resources, configure one or more preamble repetition units, and receiving grant-free preamble and data from a user equipment, wherein the grant-free preamble is received in the configured one or more preamble repetition units and within the bandwidth allocated for grant-free preamble transmission, and data is received in the bandwidth allocated for grant-free resources.

According to a seventh aspect of the present invention, an apparatus comprising: at least one processor; and at least one memory including computer program code, wherein the at least one memory and the computer program code are configured to, with the at least one processor, cause the apparatus to perform at least the following: receive scheduling information from a base station, receive configuration information from the base station, wherein the configuration information comprises at least one of: reference signal to be used by the user equipment, wherein the reference signal is orthogonal to a preamble allocated on the same bandwidth, and indication of resources to be punctured by the user equipment, wherein the resources to be punctured are allocated for a grant-free preamble transmission; and transmit reference signal and data signal based on the received scheduling information and configuration information.

According to an eighth aspect of the present invention, a method comprising: receiving scheduling information from a base station, receiving configuration information from the base station, wherein the configuration information comprises at least one of: reference signal to be used by the user equipment, wherein the reference signal is orthogonal to a preamble allocated on the same bandwidth, and indication of resources to be punctured by the user equipment, wherein the resources to be punctured are allocated for a grant-free preamble transmission; and transmitting reference signal and data signal based on the received scheduling information and configuration information.

According to a ninth aspect of the present invention, a computer program product comprising a non-transitory computer-readable medium bearing computer program code embodied therein for use with a computer, the computer program code comprising: receiving scheduling information from a base station, receiving configuration information from the base station, wherein the configuration information comprises at least one of: reference signal to be used by the user equipment, wherein the reference signal is orthogonal to a preamble allocated on the same bandwidth, and indication of resources to be punctured by the user equipment, wherein the resources to be punctured are allocated for a grant-free preamble transmission; and transmitting reference signal and data signal based on the received scheduling information and configuration information.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

In the following description and claims, unless defined otherwise, all technical and scientific terms used herein have the same meaning as commonly understood by one of ordinary skills in the art to which this disclosure belongs.

Figure 1:
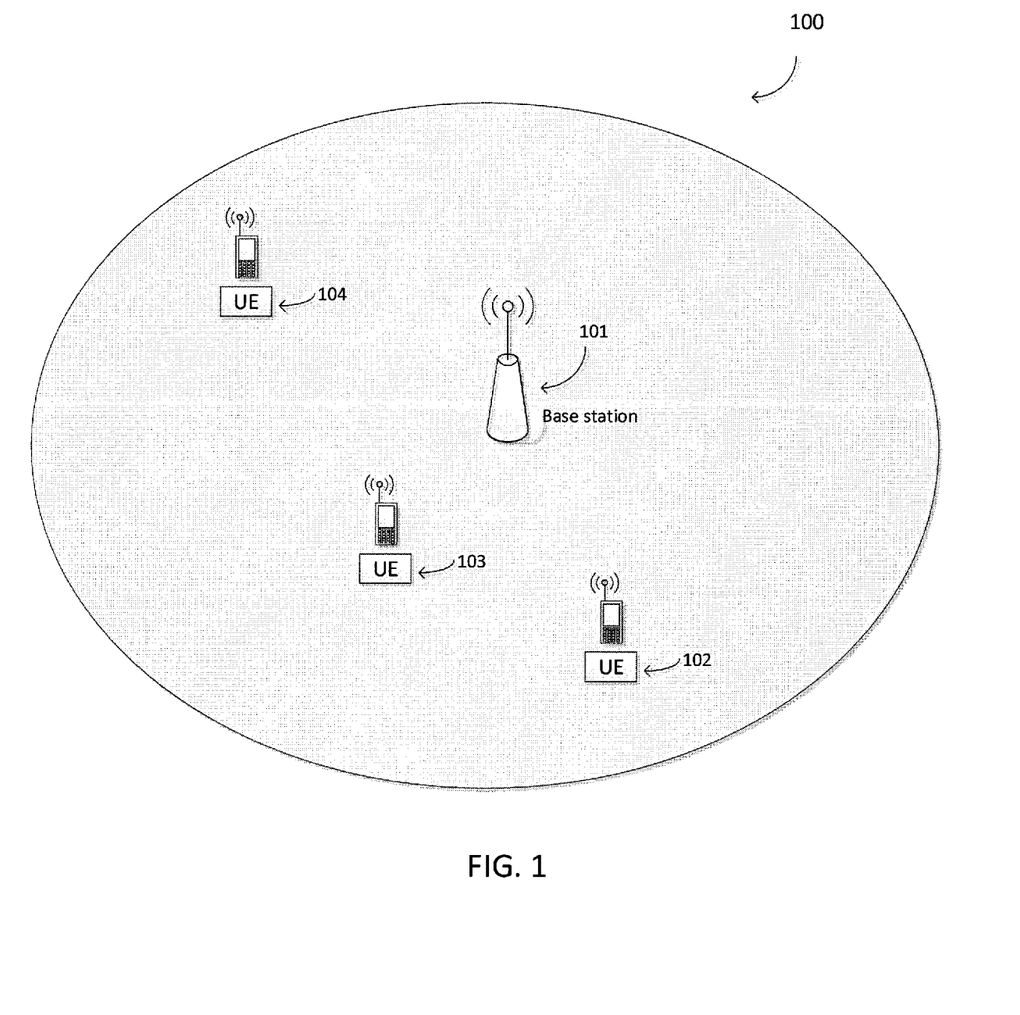
FIG. 1 illustrates an example wireless communication network in which some embodiments of the present invention may be practiced.

FIG. 1 illustrates an example wireless communication network 100 in which some example embodiments of the present invention may be practiced. As shown in FIG. 1, the wireless communication network 100 may include one or more base stations, for example base station 101, which may be in a form of an eNB or gNB. It will be appreciated that the base station 101 could also be in a form of a Node B, BTS (Base Transceiver Station), and/or BSS (Base Station Subsystem), access point (AP) and the like. The base station 101 may provide radio connectivity to a set of user equipments, for example UE 102-104 within its coverage. A UE (e.g., UE 102) may connect to base station 101 for cellular communication, or communicate with another UE (e.g., UE 103 or 104) directly via device to device (D2D) or machine to machine (M2M) communication. A downlink (DL) transmission herein refers to a transmission from the base station to a UE, and an uplink (UL) transmission refers to a transmission in an opposite direction.

In some example embodiments, user equipment, such as 102-104, may be implemented as a mobile device and/or a stationary device. The user equipment may be referred to as, for example, a wireless device, a mobile station, a mobile unit, a subscriber station, a wireless terminal, a tablet, a smart phone, and/or the like. In some example embodiments, UE 102-104 may be implemented as multi-mode user devices configured to operate using a plurality of radio access technologies, although a single-mode device may be used as well. For example, UE 102-104 may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. The user equipment may be located within the coverage area of a cell or multiple cells.

Although FIG. 1 depicts a certain quantity and configuration of devices, other quantities and configurations may be implemented as well. For example, other quantities and configurations of base stations/access points, cells, and user equipments may be implemented as well.

Some applications to be supported in a 5G network require low latency which may not be ensured by using conventional technologies. For example, uplink transmissions in a legacy Long Term Evolution (LTE) system are grant-based; that is to say, a user equipment (UE) transmits data in uplink in response to a uplink grant received from a serving evolved NodeB (eNB). The uplink grant indicates uplink scheduling information such as physical resource block (PRB) allocation, modulation and coding schemes (MCS), power control for a physical uplink shared channel (PUSCH). The grant-based scheme enables the eNB to fully control uplink transmissions from UEs, and at the same time causes latency in uplink transmissions. In an application scenario requiring low latency, for example, a URLLC scenario in 5G, it is desired to transmit uplink data in a grant-free manner, which means that a UE may transmit uplink data autonomously without requiring a scheduling signaling from the eNB before the uplink transmission. In this way, data may be transmitted immediately in the earliest available time slot once they arrive, without waiting for a scheduling grant from the eNB.

A grant-free autonomous transmission may also be called a transmission in an "arrive-and-go" manner. Benefit from such an "arrive-and-go" manner includes reduction in overhead, latency and energy consumption. First, signaling overhead associated with uplink grant transmissions, further potential optimizations in UE states and random access channel (RACH) procedures and messages may be saved. Second, delay needed for sending a grant request and a scheduling grant may be reduced. Third, UE can stay in a discontinuous receiving (DRX) for a longer time duration and is able to transmit quickly when data arrives.

A resource allocation scheme for grant-free transmission is proposed in a 3GPP contribution R1-167254, defining a concept of a resource pool which is a set of time-frequency resource units. One resource pool may contain a certain number of Orthogonal Frequency Division Multiplexing (OFDM) symbols in time domain and a number of subcarriers in frequency domain. The resource pool structure may be different for different use cases, and also may be subject to UE capabilities, e.g., the bandwidth supported by the UE. For example, for eMBB or URLLC, a resource pool might contain one or multiple PRBs in frequency domain within one time slot; while for mMTC, it might contain one or a few subcarriers in frequency domain, and multiple transmission time intervals (TTIs) in time domain. A resource pool may contain multiple resource units based on configuration from the eNB, and each user may select a certain resource units for its grant-free transmission.

Figure 2:
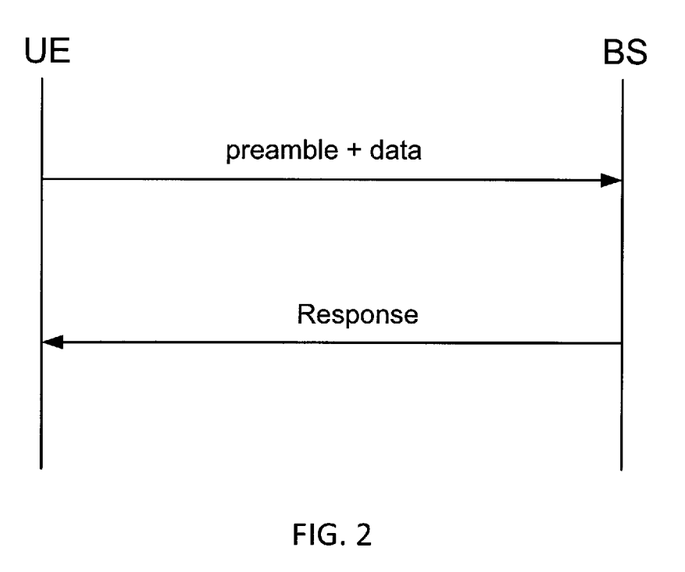
FIG. 2 illustrates an example sequence chart in accordance with some example embodiments.

FIG. 2 illustrates an example sequence chart in accordance with some example embodiments. Uplink grant-free transmission may include a preamble transmitted by a UE together with data transmission, and then followed by a response from a base station. The preamble may be used to indicate a grant-free data transmission, so that the base station does not need to always detect uplink data channel and therefore means lower decoding effort. The preamble may also be used to identify a UE, and may further be used as a reference signal for channel estimation. It should be noted that here the preamble is served as one kind of dedicated signals to do UE identification. There may be other form of dedicated signals, such as a scheduling request, or a special reference signal.

In some example embodiments, each URLLC grant-free UEs that are allocated with same grant-free resources may be allocated with a unique UE identification. Therefore through preamble detection, the base station could identify which UE is transmitting even though it does not correctly decode the transmitted data block. Consequently, the base station may apply soft combination when receiving retransmission(s). For URLLC, the UE identification should be reliable enough, in order to improve the data detection performance.

The subject matter disclosed herein provides a way to enable robust grant-free preamble detection performance for UE identification detection. Specifically, there is provided a way of allowing preamble transmission of a grant-free transmission to span a larger bandwidth than the bandwidth allocated for data transmission by extending preamble into the schedule-based or grant-based region. The benefit for doing this is to enhance the probability of preamble detection by transmitting preamble over a larger bandwidth.

Figure 3A:
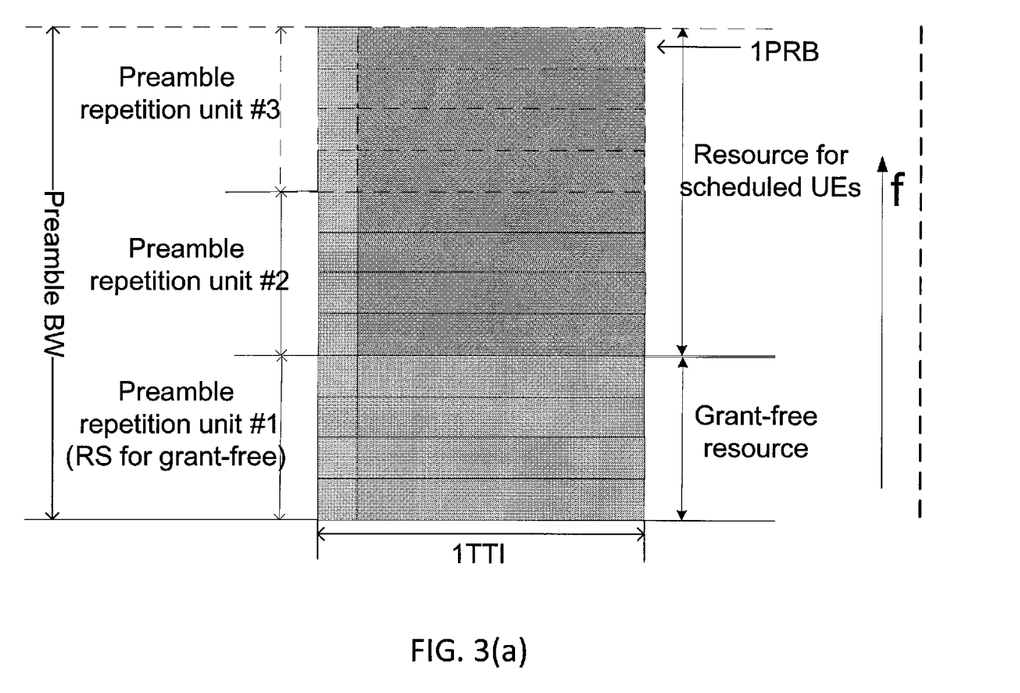
FIG. 3(a)-3(c) depicts examples of resource allocation in accordance with some example embodiments.
Figure 3B:
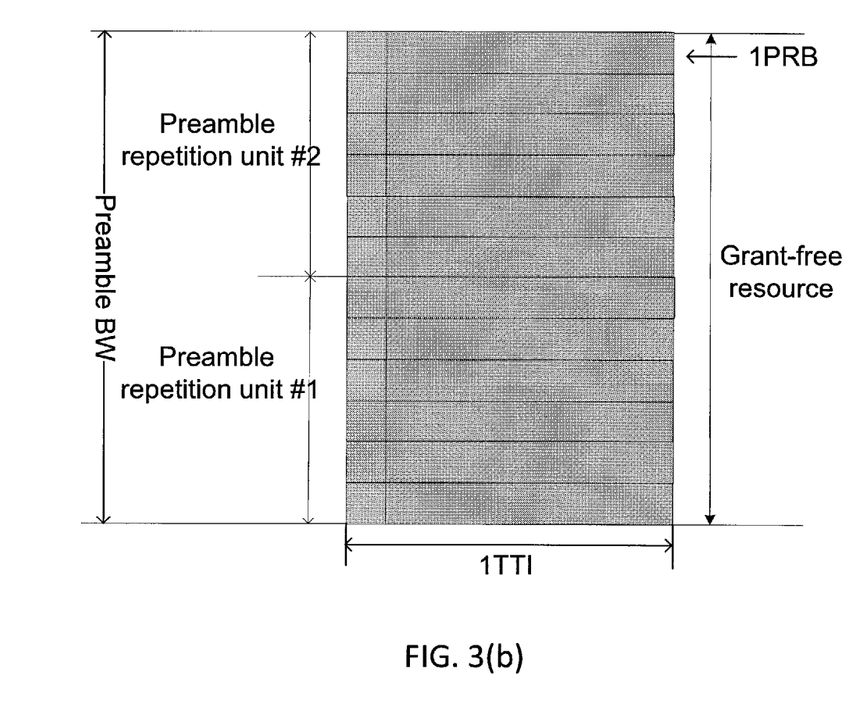
Figure 3C:
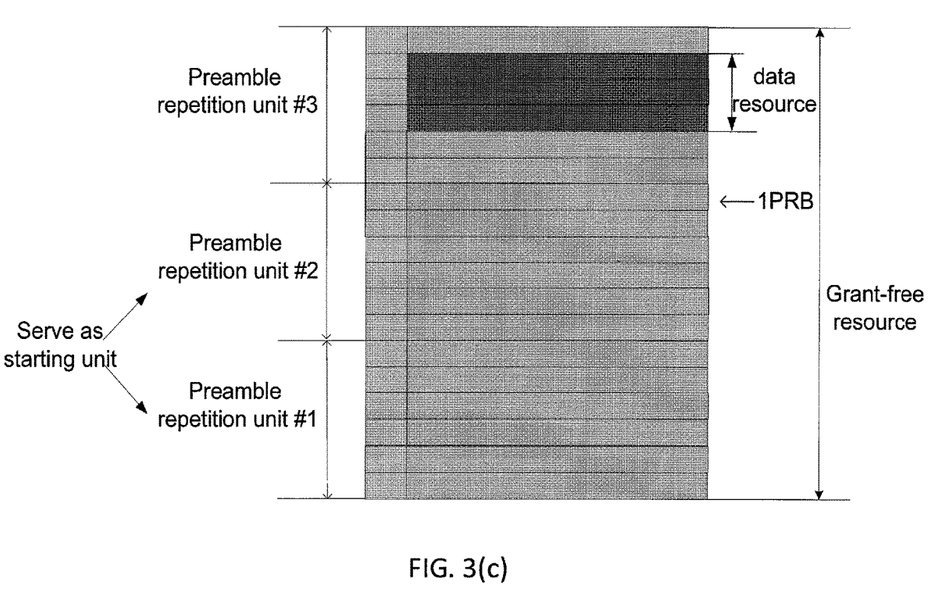

FIG. 3(a)-3(c) depicts examples of resource allocation in accordance with some example embodiments. For illustration purpose, one OFDM symbol is used for preamble transmission. In practice, the number of OFDM symbols for preamble transmission may be based on, for example, BS configuration. For ease of discussions, the examples are described below with reference to UE 102-104 and the environment as described with reference to FIG. 1.

In the example shown in FIG. 3(a), the preamble bandwidth is larger than the allocated grant-free resources. It is configured to contain three repetition units, where the repetition unit #1 is located within the grant-free resources, while the other two repetition units are located outside the grant-free resources. In an example embodiment, a grant-free UE 102 is configured to transmit the preamble in all three preamble units but the data signal transmits only in the configured grant-free resources. The preamble transmitted in repetition unit #1 may be taken as reference signal for data demodulation purpose. The base station may, for example, schedule UE 103 in the resources that the preamble repetition unit #2 locates. In this case, the UE 103 may transmit reference signal that is orthogonal and CDM with grant-free preambles to avoid or reduce interference between UE 102 and UE 103.

In the example shown in FIG. 3(b), the preamble uses the same bandwidth as the allocated grant-free resources. When UE 102 is configured to transmit in only one preamble repetition unit, it may choose the preamble repetition unit that is overlapped in bandwidth with the selected data resources such that the preamble may also serve as reference signal.

In the example shown in FIG. 3(c), the preamble uses the same bandwidth as the allocated grant-free resources. In this example, there are 3 (K=3) preamble repetition units. When UE 102 is configured to transmit preamble in two preamble repetition units (M=2), there are K−M+1=2 preamble repetition units that may be taken as starting units for preamble transmission. The preamble transmission may start from the lowest preamble unit, for example, preamble repetition unit #1 and #2 may serve as starting unit. As shown in FIG. 3(c), UE 102 selects three PRBs for data transmission, the three PRBs are overlapping with the preamble repetition #3 in frequency domain. UE 102 may select the starting unit that is nearest with the selected data resources, for example, unit #2 as the starting unit for preamble transmission and transmit preamble in unit #2 and unit #3.

Figure 4:
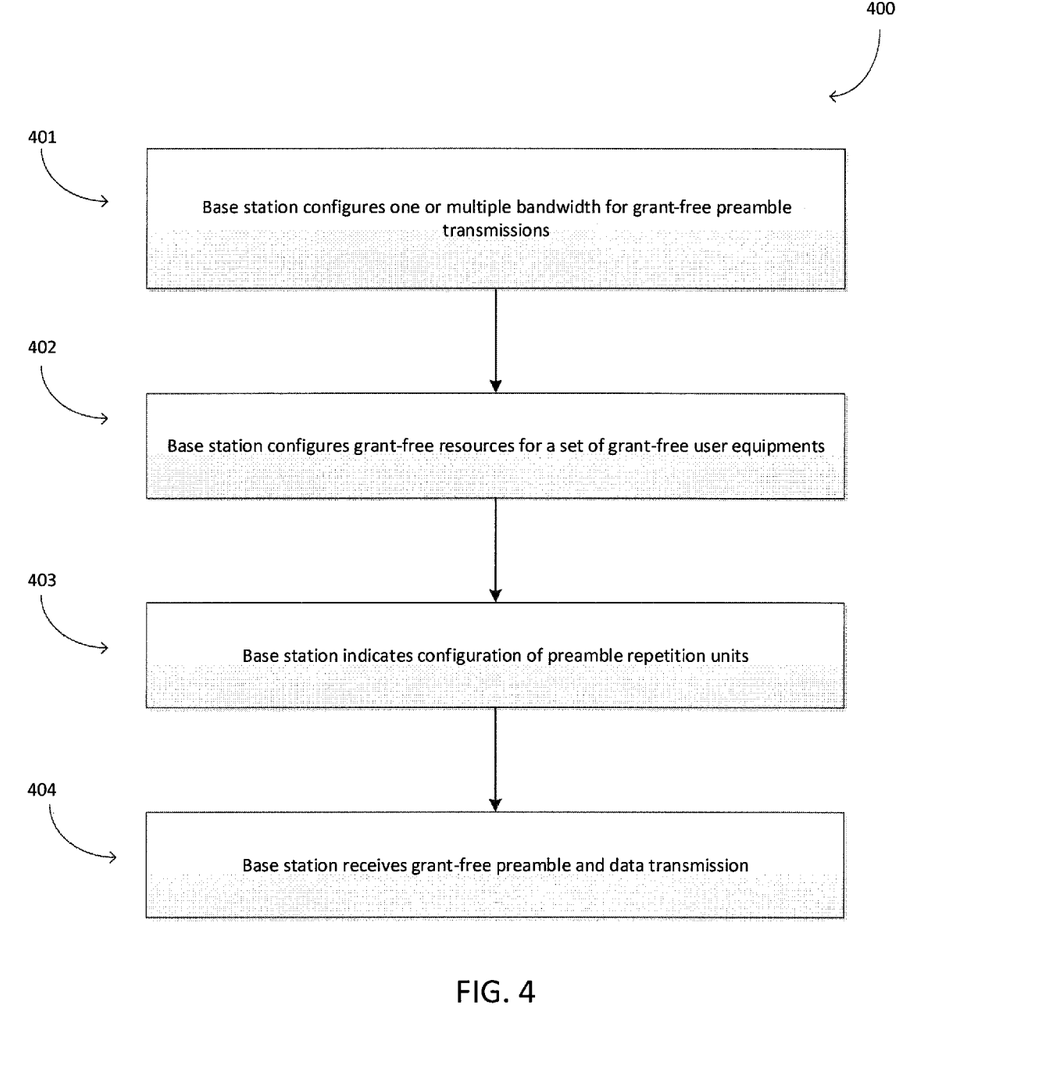
FIG. 4 depicts an example process in base station in accordance with some example embodiments.

FIG. 4 depicts an example process in base station in accordance with some example embodiments. For ease of discussions, the examples are described below with reference to base station 101, UE 102-104 and the environment as described with reference to FIG. 1.

As illustrated in FIG. 4, at block 401, base station 101 configures one or multiple bandwidth (BW) for grant-free preamble transmission. The configuration may be through higher layer signaling (including broadcasting) and/or physical layer signaling. The size of each preamble transmission bandwidth may be same or different, to meet the UE detection performance for different set of URLLC UEs. In some example embodiments, the preamble is transmitted in a physical uplink control channel (PUCCH), the bandwidth of which is configured by the base station.

At block 402, base station 101 may configure grant-free resources for a set of grant-free UEs. The grant-free resources are configured within the bandwidth for grant-free preamble transmission, and may start from the lowest (or highest) PRBs of the preamble bandwidth. Depending on the allocated grant-free resources, the bandwidth for grant-free preamble transmission may be the same or different from the bandwidth for grant-free data transmission. The full or partial preamble sequences transmitted in the grant-free resources may be used as reference signal for grant-free data demodulation.

The configured bandwidth for grant-free preamble transmission may be divided to one or multiple repetition units. At block 403, base station 101 indicates the configuration of preamble repetition units through higher layer signaling (including broadcasting) and/or physical layer signaling. The number of preamble repetition units may depend on the base station configuration. A grant-free UE may be allocated with a sequence identification, and may transmit preamble in one or more repetition units, in order to meet the detection requirement. The number of repetition units a UE shall use for grant-free preamble transmission may depend on base station configuration.

At block 404, base station 101 receives grant-free preamble and data transmissions from UE 102. The grant-free preamble may be received in one or multiple repetition units configured by base station 101. The grant-free data may be received in the grant-free resources configured by base station 101.

When the bandwidth for grant-free preamble transmission is larger than the bandwidth for grant-free data transmission, a preamble repetition unit may be located outside of grant-free resources, i.e. a preamble repetition unit may be located within grant-based resources. Reference is now made to FIG. 3(*a*), wherein preamble repetition units #2 and #3 are located within grant-based resources. In some example embodiment, in order to avoid or reduce interference from/to UEs scheduled in grant-based resources, base station 101 may configure the reference signals for UEs scheduled in grant-based resources that follow the grant-free preamble transmission pattern. For example, base station 101 may configure the reference signals for UEs scheduled in grant-based resources that is orthogonal to the grant-free preambles. Base station 101 may also configure a sequence ID, based on which the scheduled UE may decide its reference signal sequence. In some other example embodiments, in order to avoid or reduce interference from/to UEs scheduled in grant-based resources, base station 101 may configure UEs scheduled in grant-based resources to puncture the resources allocated for grant-free preamble transmission.

Figure 5:
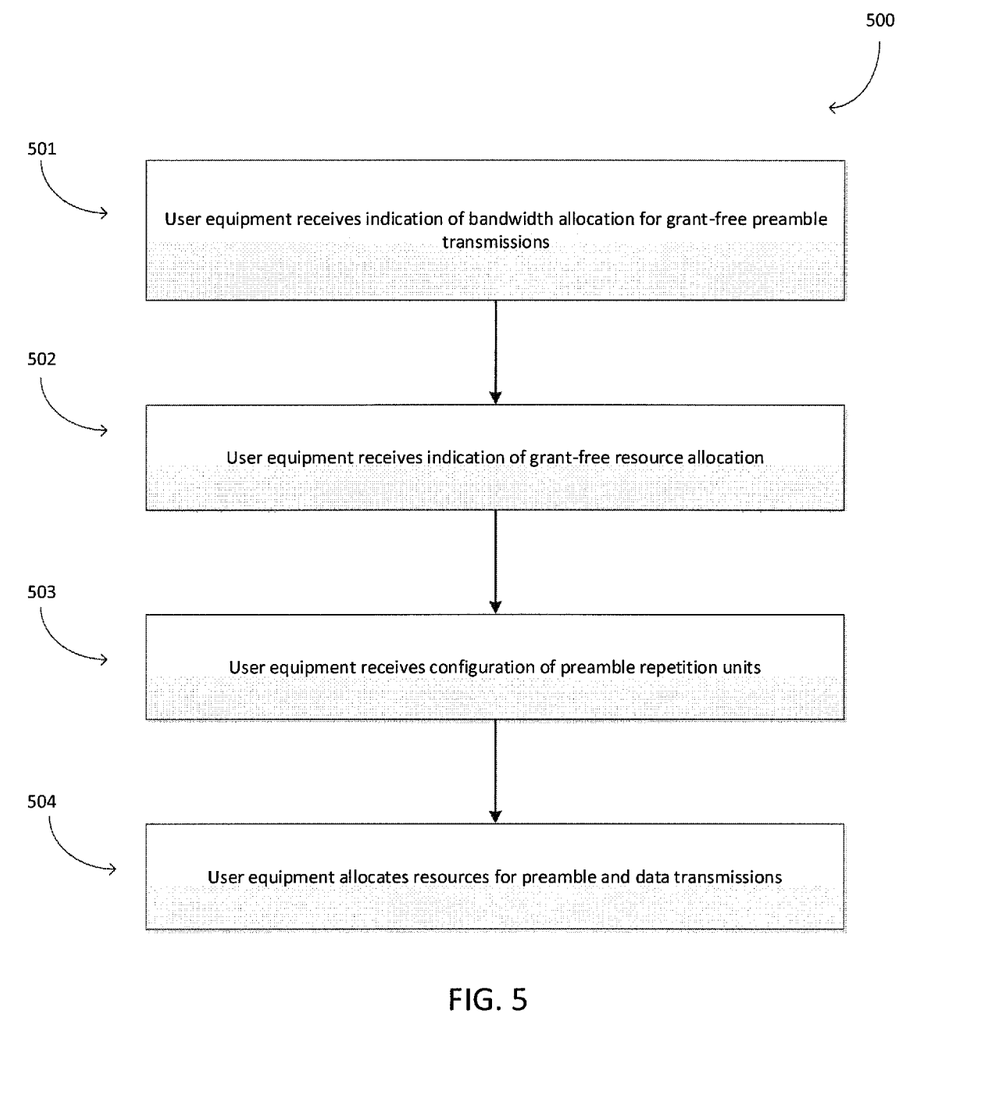
FIG. 5 depicts an example process in a grant-free user equipment in accordance with some example embodiments.

FIG. 5 depicts an example process in a grant-free user equipment in accordance with some example embodiments. For ease of discussions, the examples are described below with reference to base station 101, UE 102 and the environment as described with reference to FIG. 1

As illustrated in FIG. 5, at block 501, grant-free UE 102 receives indication of bandwidth allocation for grant-free preamble transmissions from base station 101.

At block 502, UE 102 receives indication of grant-free resource allocation from base station 101.

At block 503, UE 102 receives configuration of preamble repetition units from base station 101.

At block 504, UE 102 allocate resources for preamble and data transmissions. Grant-free data may be allocated within the grant-free resource configured by base station 101. Reference is now made to FIG. 3(*c*), where an example of grant-free data allocation is shown. Grant-free preamble may be allocated in one or multiple preamble repetition units. When the configured number of repetition units for preamble transmission is lower than whole number of preamble repetition units in the grant-free resources, UE 102 needs to decide which preamble repetition unit(s) it can use for preamble transmission. The repetition unit overlapping with the allocated or UE selected resources for data transmission may be selected for preamble transmission, by doing so the preamble can be taken as reference signal because the preamble and data are in the same frequencies or close to each other. The selection of repetition units for preamble allocation may be implementation specific at a UE. For example, when there are totally K repetition units, UE 102 is configured with M repetition units for preamble transmission, there are K−M+1 repetition units that can be used as the starting units. UE 102 may select the starting unit that is nearest with the allocated or UE selected resources for data transmission and transmit preamble in correspondingly M repetition units. Reference is now made to the descriptions of FIG. 3(*c*). As shown in FIG. 3(*c*), UE 102 selects three PRBs for data transmission, the three PRBs are overlapping with the preamble repetition #3 in frequency domain. UE 102 may select the starting unit that is nearest with the selected data resources, for example, unit #2 as the starting unit for preamble transmission and transmit preamble in unit #2 and unit #3.

Figure 6:
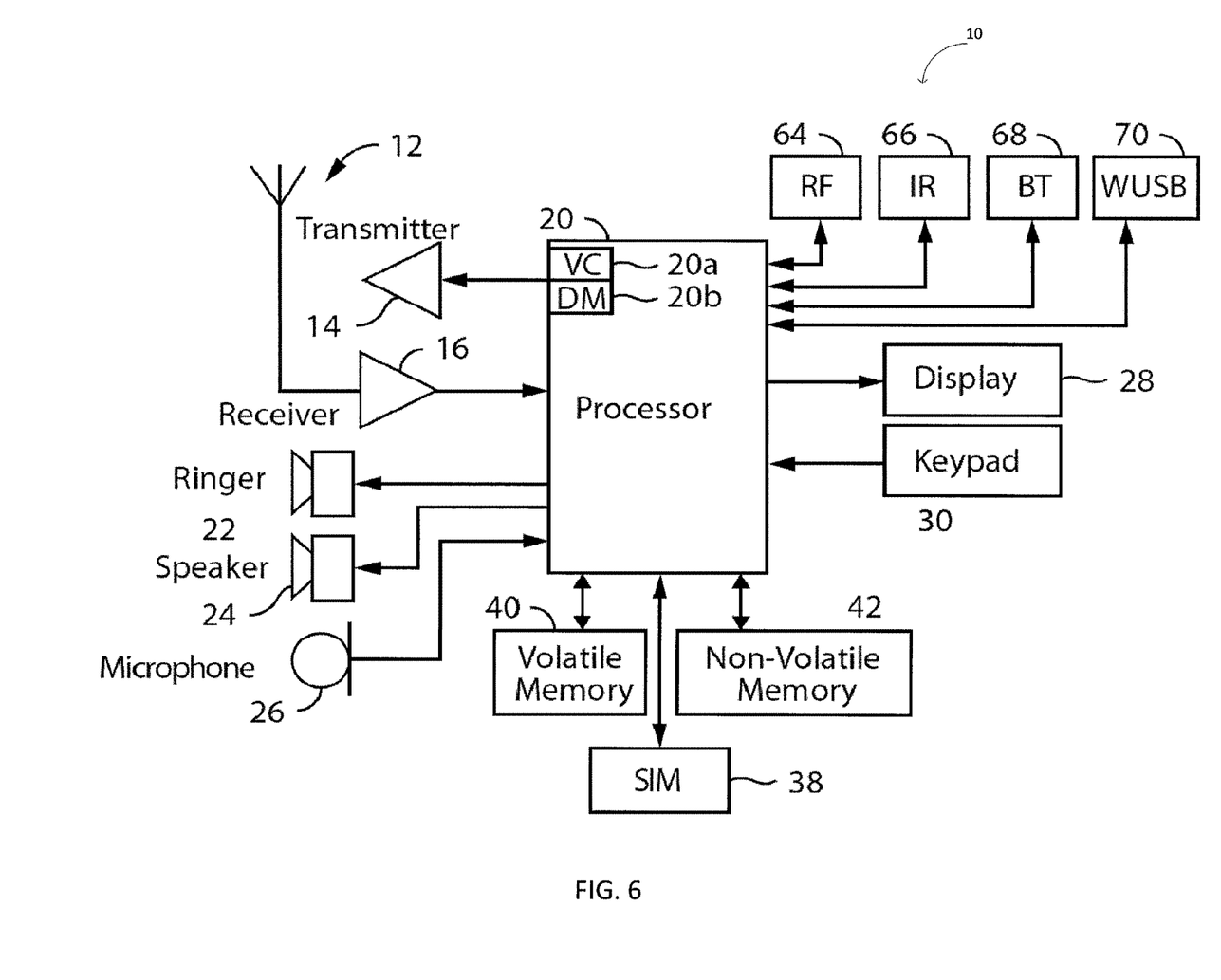
FIG. 6 illustrates a block diagram of a user equipment in accordance with some example embodiments.

FIG. 6 illustrates a block diagram of an apparatus 10, such as UE 102-104, in accordance with some example embodiments. The apparatus 10 (or portions thereof) may be configured to provide a user equipment, a communicator, a machine type communication device, a wireless device, a wearable device, a smartphone, a cellular phone, a wireless sensor/device (for example, a wireless device which is part of a distributed architecture in for example, a car, a vehicle, a robot, a human, and/or the like), a personal digital assistant (PDA), portable computers, image capture terminal devices such as digital cameras, gaming terminal devices, music storage and playback appliances. In the case of the distributed architecture, the wireless device may communicate via one or more transceiver modules and/or via a hub that may hide the actual distribution of functionalities from the network.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit, ASIC, or field programmable gate array (FPGA), and/or the like) or some combination thereof. Accordingly, although illustrated in FIG. 6 as a single processor, in some embodiments the processor 20 comprises a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the apparatus 10 may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000, Wideband Code Division Multiple Access, WCDMA, Time Division-Synchronous Code Division Multiple Access, TD-SCDMA, and/or the like. The apparatus may be additionally capable of operating in accordance with 3.9G wireless communication protocols such as Long Term Evolution, LTE, or Evolved Universal Terrestrial Radio Access Network, E-UTRAN, and/or the like. Additionally, for example, the apparatus may be capable of operating in accordance with fourth-generation, 4G, wireless communication protocols such as LTE Advanced and/or the like as well as similar wireless communication protocols that may be subsequently developed.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus 10 may comprise a battery for powering various circuits related to the apparatus, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 6, apparatus 10 may also include one or more mechanisms for sharing and/or obtaining data. For example, the apparatus may comprise a short-range radio frequency, RF, transceiver and/or interrogator 64, so data may be shared with and/or obtained from electronic devices in accordance with RF techniques. The apparatus may comprise other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise a memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment. The memories may comprise an identifier, such as for example, an international mobile equipment identification (IMEI) code, capable of uniquely identifying apparatus 10.

While FIG. 6 is described above primarily in the context of a user equipment, certain of the components discussed, such as memories, processors, transceivers and antennas, may be employed to implement in a network-side device, such as a base station.

Figure 7:
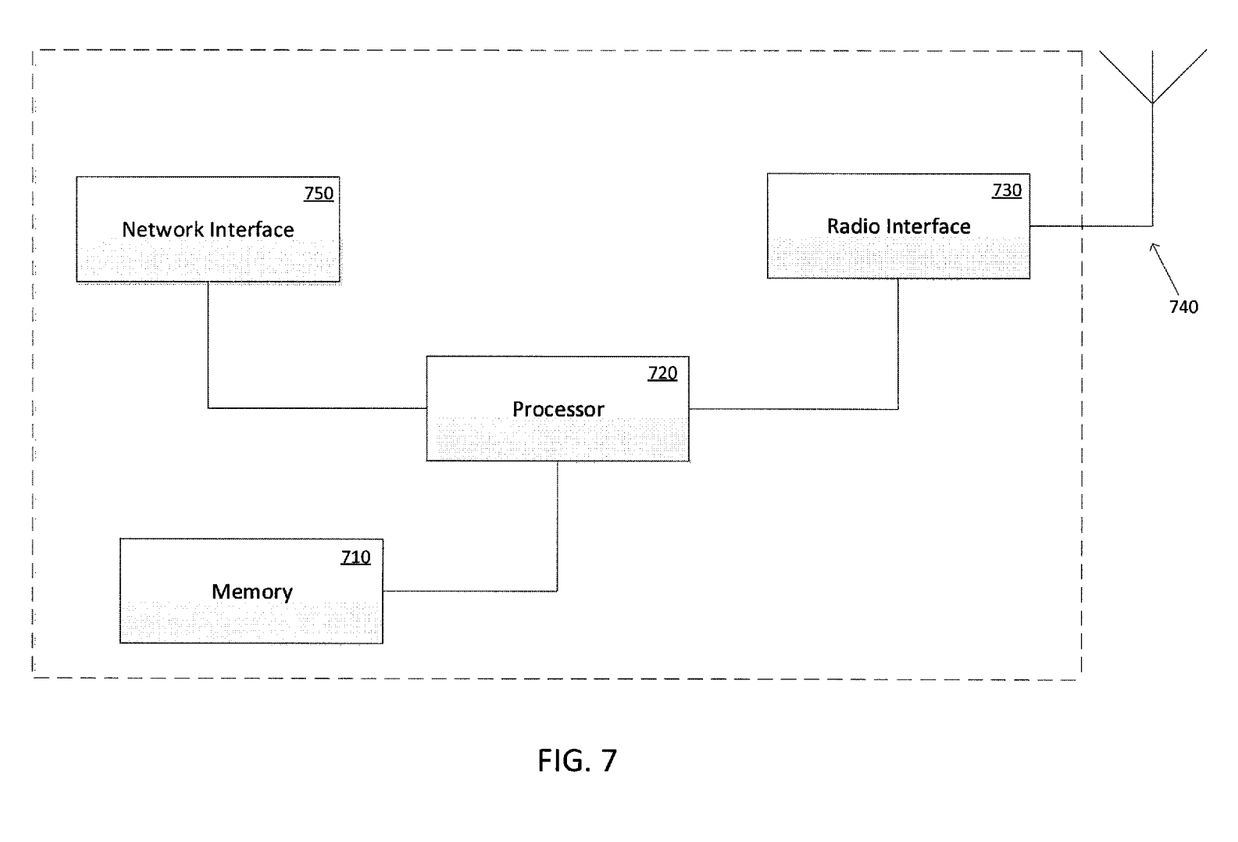
FIG. 7 illustrates a block diagram of a base station in accordance with some example embodiments.

FIG. 7 depicts an example implementation of a base station, which may be implemented at for example base station 101 in accordance with some example embodiments. The base station may include one or more antennas 740 configured to transmit via a downlink and configured to receive uplinks via the antenna(s). The base station may further include a plurality of radio interfaces 730 coupled to the antenna 740. The radio interfaces 730 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 730 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).). The base station may further include one or more network interfaces 750, for receiving and transmitting to other base stations and/or core networks. The base station may further include one or more processors, such as processor 720, for controlling the interfaces 730 and 750 and for accessing and executing program code stored in memory 710. In some example embodiments, the memory 710 includes code, which when executed by at least one processor causes one or more of the operations described herein with respect to a base station.

Without in any way limiting the scope, interpretation, or application of the claims appearing below, a technical effect of one or more of the example embodiments disclosed herein may include enable preamble transmission of a grant-free transmission to span a larger bandwidth than the data bandwidth by extending preamble into the schedule-based region. The benefit for doing this is to enhance the probability of preamble detection by transmitting over a larger bandwidth.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims. Other embodiments may be within the scope of the following claims. The term "based on" includes "based at least in part on". The use of the phase "such as" means "such as for example" unless otherwise indicated.

What is claimed is:

1. A method, comprising:
receiving indication of bandwidth allocation for grant-free preamble transmission;
receiving indication of bandwidth allocation for grant-free resources, wherein the bandwidth allocated for grant-free preamble transmission is the same or larger than the bandwidth allocated for grant-free resources;
receiving configuration associated with one or more preamble repetition units;
determining a total number of preamble repetition units available in frequency domain based on the received configuration;
determining a number of preamble repetition units for preamble transmission;
selecting the number of preamble repetition units for preamble transmission, wherein the selecting comprises: when the number of preamble repetition units for preamble transmission is less than the total number of preamble repetition units available, selecting which preamble repetition units for preamble transmission based on the bandwidth allocation for grant-free resources; and
allocating resources for grant-free preamble and data transmissions, wherein the grant-free preamble is allocated in the selected preamble repetition units, and data is allocated in the grant-free resources.

2. The method of claim 1, wherein the resources for grant-free preamble is allocated within the grant-free resources.

3. The method of claim 1, wherein the resources for grant-free preamble is allocated outside the grant-free resources.

4. The method of claim 1, wherein selecting which preamble repetition units for preamble transmission comprises: selecting a starting unit that is nearest to the allocated resources for data transmission.

5. The method of claim 4, wherein selecting which preamble repetition units for preamble transmission for preamble transmission further comprises allocating grant-free preamble from the starting unit.

6. The method of claim 1, in an instance in which the grant-free preamble is allocated on the same bandwidth as data, the grant-free preamble is served as reference signal.

7. An apparatus, comprising:
at least one processor; and
at least one memory including computer program code,
wherein the at least one memory and the computer program code are configured to, with the at least one processor, cause the apparatus to at least:
receive indication of bandwidth allocation for grant-free preamble transmission;
receive indication of bandwidth allocation for grant-free resources, wherein the bandwidth allocated for grant-free preamble transmission is the same or larger than the bandwidth allocated for grant-free resources;
receive configuration associated with one or more preamble repetition units;
determine a total number of preamble repetition units available in frequency domain based on the received configuration;
determine a number of preamble repetition units for preamble transmission;
select the number of preamble repetition units for preamble transmission, wherein the selecting comprises: when the number of preamble repetition units for preamble transmission is less than the total number of preamble repetition units available, selecting which preamble repetition units for preamble transmission based on the bandwidth allocation for grant-free resources; and
allocate resources for grant-free preamble and data transmissions, wherein the grant-free preamble is allocated in the selected preamble repetition units, and data is allocated in the grant-free resources.

8. The apparatus of claim 7, wherein the resources for grant-free preamble is allocated within the grant-free resources.

9. The apparatus of claim 7, wherein the resources for grant-free preamble is allocated outside the grant-free resources.

10. The apparatus of claim 7, wherein selecting which preamble repetition units for preamble transmission comprises: selecting a starting unit that is nearest to the allocated resources for data transmission.

11. The apparatus of claim 10, wherein wherein selecting which preamble repetition units for preamble transmission further comprises allocating grant-free preamble from the starting unit.

12. The apparatus of claim 7, in an instance in which the grant-free preamble is allocated on the same bandwidth as data, the grant-free preamble is served as reference signal.

13. The apparatus of claim 7, wherein the configuration associated with preamble repetition units comprises at least one of: the total number of preamble repetition units available and the number of preamble repetition units for preamble transmission.

14. An apparatus, comprising:
at least one processor; and
at least one memory including computer program code,
wherein the at least one memory and the computer program code are configured to, with the at least one processor, cause the apparatus to perform at least the following:
configure bandwidth allocation for grant-free preamble transmission;
configure bandwidth allocation for grant-free resources, wherein the bandwidth allocated for grant-free preamble transmission is the same or larger than the bandwidth allocated for grant-free resources;
configure preamble repetition units, wherein the configuration of preamble repetition units comprises information associated with a total number of preamble repetition units available in frequency domain and a number of preamble repetition units for preamble transmission;
cause a user equipment to select the number of preamble repetition units for preamble transmission, wherein the selecting comprises: when the number of preamble repetition units for preamble transmission is less than the total number of preamble repetition units available, selecting which preamble repetition units for preamble transmission based on the bandwidth allocation for grant-free resources; and
receive grant-free preamble and data from the user equipment, wherein the grant-free preamble is received in the selected preamble repetition units, and data is received in the bandwidth allocated for grant-free resources.

15. The apparatus of claim 14, wherein the resources for grant-free preamble is allocated within the grant-free resources.

16. The apparatus of claim 14, wherein the resources for grant-free preamble is allocated outside the grant-free resources.

17. The apparatus of claim 14, wherein the received grant-free preamble is used as reference signal for demodulation.

18. The apparatus of claim 14, the apparatus is further caused to:
configure reference signals for another user equipment which is scheduled in grant-based resources, wherein the configuring comprises assigning reference signals orthogonal to the grant-free preambles.

19. The apparatus of claim 14, the apparatus is further caused to: send the configured bandwidth allocation for grant-free transmission, the configured bandwidth allocation for grant-free resources and the configured one or more preamble repetition units via at least one of broadcast signaling, unicast higher layer signaling and unicast physical layer signaling.

20. The apparatus of claim 14, wherein the bandwidth allocated for grant-free preamble transmission comprises a set of bandwidths.

* * * * *